(12) United States Patent
Gonzales, Jr.

(10) Patent No.: US 11,048,963 B2
(45) Date of Patent: Jun. 29, 2021

(54) PRODUCT IMAGE GENERATION SYSTEM

(71) Applicant: eBay Inc., San Jose, CA (US)

(72) Inventor: Sergio Pinzon Gonzales, Jr., San Jose, CA (US)

(73) Assignee: eBay Inc., San Jose, CA (US)

(*) Notice: Subject to any disclaimer, the term of this patent is extended or adjusted under 35 U.S.C. 154(b) by 0 days.

(21) Appl. No.: 16/288,828

(22) Filed: Feb. 28, 2019

(65) Prior Publication Data

US 2019/0197343 A1 Jun. 27, 2019

Related U.S. Application Data

(63) Continuation of application No. 14/973,962, filed on Dec. 18, 2015, now Pat. No. 10,255,703.

(51) Int. Cl.
*G06K 9/46* (2006.01)
*G06K 9/62* (2006.01)
*G06T 11/00* (2006.01)
*G06T 11/60* (2006.01)

(52) U.S. Cl.
CPC ......... *G06K 9/4652* (2013.01); *G06K 9/6255* (2013.01); *G06K 9/6267* (2013.01); *G06T 11/00* (2013.01); *G06T 11/60* (2013.01)

(58) Field of Classification Search
CPC combination set(s) only.
See application file for complete search history.

(56) References Cited

U.S. PATENT DOCUMENTS

| | | | |
|---|---|---|---|
| 5,594,850 A | 1/1997 | Noyama et al. | |
| 5,638,465 A | 6/1997 | Sano et al. | |
| 5,706,416 A | 1/1998 | Mann et al. | |
| 6,337,925 B1 | 1/2002 | Cohen et al. | |
| 7,466,868 B2* | 12/2008 | Wilensky ............ | G06K 9/40 382/168 |
| 7,508,982 B2 | 3/2009 | Tsuyuki et al. | |
| 7,657,100 B2 | 2/2010 | Gokturk et al. | |
| 8,194,985 B2* | 6/2012 | Grigsby ............ | G06K 9/00 382/218 |

(Continued)

OTHER PUBLICATIONS

Applicant Initiated Interview Summary received for U.S. Appl. No. 14/973,962, dated Aug. 31, 2017, 3 pages.
(Continued)

*Primary Examiner* — Motilewa Good Johnson
(74) *Attorney, Agent, or Firm* — Faegre Drinker

(57) ABSTRACT

Methods and systems for generating new product images are disclosed. In one aspect, a method includes identifying, via hardware processing circuitry, a template for a category of products, the template defining locations of attributes of products belonging to the category, identifying, via the hardware processing circuitry, common attributes of products of the category based on the template, averaging, via the hardware processing circuitry, corresponding pixel values across images representing the products having the common attributes, generating, via the hardware processing circuitry, a new product image representing a new product based on the averaged pixel values; and generating, via the hardware processing circuitry, a modified new product image by varying attributes of the new product based on the locations of the attributes defined by the template.

20 Claims, 7 Drawing Sheets

(56) References Cited

U.S. PATENT DOCUMENTS

| | | | |
|---|---|---|---|
| 8,582,802 B2* | 11/2013 | Clippard | G06K 9/4652 382/100 |
| 8,831,279 B2* | 9/2014 | Rodriguez | G06T 11/60 382/103 |
| 8,843,858 B2 | 9/2014 | Devi et al. | |
| 8,861,844 B2* | 10/2014 | Chittar | G06K 9/4642 382/162 |
| 8,971,669 B2 | 3/2015 | Coppin et al. | |
| 8,983,142 B1* | 3/2015 | Zhang | G06F 16/954 382/111 |
| 9,008,438 B2 | 4/2015 | Kawanishi et al. | |
| 9,015,579 B2* | 4/2015 | Jin | G06F 16/51 715/243 |
| 9,047,633 B2* | 6/2015 | Gershon | G06Q 30/0627 |
| 9,177,225 B1 | 11/2015 | Cordova-Diba et al. | |
| 9,400,997 B2 | 7/2016 | Beaver et al. | |
| 9,436,704 B2 | 9/2016 | Gershon et al. | |
| 9,471,849 B2 | 10/2016 | Gurwicz et al. | |
| 9,536,335 B2* | 1/2017 | Abdollahian | G06T 5/005 |
| 10,255,703 B2 | 4/2019 | Gonzales, Jr. | |
| 10,534,809 B2* | 1/2020 | Wiesel | G06T 7/194 |
| 2003/0107586 A1 | 6/2003 | Takiguchi et al. | |
| 2003/0113017 A1 | 6/2003 | Thomas et al. | |
| 2004/0264810 A1 | 12/2004 | Taugher et al. | |
| 2005/0071242 A1 | 3/2005 | Allen et al. | |
| 2005/0074180 A1* | 4/2005 | Wilensky | G06K 9/40 382/254 |
| 2005/0083347 A1* | 4/2005 | Wilensky | G06T 5/003 345/606 |
| 2005/0131571 A1 | 6/2005 | Costin | |
| 2005/0289158 A1* | 12/2005 | Weiss | G06F 16/217 |
| 2008/0082426 A1 | 4/2008 | Gokturk et al. | |
| 2008/0109327 A1 | 5/2008 | Mayle et al. | |
| 2008/0118145 A1 | 5/2008 | Kim et al. | |
| 2008/0212899 A1 | 9/2008 | Gokturk et al. | |
| 2010/0036753 A1 | 2/2010 | Harvill et al. | |
| 2010/0166339 A1 | 7/2010 | Gokturk et al. | |
| 2011/0064301 A1 | 3/2011 | Sun et al. | |
| 2011/0234581 A1 | 9/2011 | Eikelis et al. | |
| 2012/0022120 A1 | 1/2012 | Kobayashi et al. | |
| 2012/0109777 A1* | 5/2012 | Lipsitz | G06Q 30/06 705/26.5 |
| 2013/0083999 A1 | 4/2013 | Bhardwaj et al. | |
| 2013/0121571 A1* | 5/2013 | Gokturk | G06Q 30/0603 382/165 |
| 2013/0294691 A1* | 11/2013 | Chertok | G06K 9/6204 382/173 |
| 2014/0083999 A1* | 3/2014 | Vivas | B41J 2/17513 220/23.83 |
| 2014/0089326 A1* | 3/2014 | Lin | G06F 16/5854 707/749 |
| 2014/0185935 A1* | 7/2014 | Iwabuchi | G06K 9/6232 382/190 |
| 2014/0186935 A1 | 7/2014 | Yoo | |
| 2014/0201027 A1* | 7/2014 | Bhardwaj | G06K 9/4642 705/26.7 |
| 2014/0219569 A1 | 8/2014 | Manson et al. | |
| 2014/0279180 A1 | 9/2014 | Beaver et al. | |
| 2015/0002545 A1 | 1/2015 | Webster et al. | |
| 2015/0019579 A1 | 1/2015 | Won | |
| 2016/0034021 A1 | 2/2016 | Kim et al. | |
| 2016/0125308 A1 | 5/2016 | Bohne et al. | |
| 2017/0178371 A1 | 6/2017 | Gonzales, Jr. | |

OTHER PUBLICATIONS

Applicant Initiated Interview Summary received for U.S. Appl. No. 14/973,962, dated Jun. 1, 2018, 3 pages.
First Action Interview—Office Action Summary received for U.S. Appl. No. 14/973,962, dated Jan. 26, 2017, 4 pages.
First Action Interview—Pre-Interview Communication received for U.S. Appl. No. 14/973,962, dated Sep. 28, 2016, 4 pages.
Non-Final Office Action received for U.S. Appl. No. 14/973,962, dated May 2, 2018, 15 pages.
Final Office Action received for U.S. Appl. No. 14/973,962, dated Jul. 21, 2017, 14 pages.
Preliminary Amendment filed for U.S. Appl. No. 14/973,962, filed Apr. 5, 2016, 9 pages.
Response to First Action Interview office action summary filed on Apr. 26, 2017 for U.S. Appl. No. 14/973,962, dated Jan. 26, 2017, 15 pages.
Response to Non-Final Office Action filed on Aug. 27, 2018, for U.S. Appl. No. 14/973,962, dated May 2, 2018, 14 pages.
Response to Final Office Action filed on Sep. 21, 2017 for U.S. Appl. No. 14/973,962, dated Jul. 21, 2017, 16 pages.
Notice of Allowance received for U.S. Appl. No. 14/973,962, dated Nov. 21, 2018, 10 pages.
U.S. Appl. No. 14/973,962 U.S. Pat. No. 10,255,703, filed Dec. 18, 2015, Original Image Generation System.

* cited by examiner

PRODUCT IMAGE GENERATION SYSTEM

CROSS REFERENCE TO RELATED APPLICATIONS

This application is a continuation of and claims priority to U.S. application Ser. No. 14/973,962, filed Dec. 18, 2015, issued as U.S. Pat. No. 10,255,703, and entitled "Original Image Generation System." The contents of this prior application are considered part of this application, and are hereby incorporated by reference in their entirety.

TECHNICAL FIELD

Embodiments of the present disclosure relate generally to processing and generating images and, more particularly, but not by way of limitation, to original image generation system.

BACKGROUND

Maintaining a robust catalogue of images and metadata are vital for content and item catalogues. Typical scenarios arise where an item does not have an associated image data due to lack of availability or inability to obtain the rights to such images. Such scenarios include novel items at the beginning stages of production or inception or use of copyright images have not been acquired. Often, in such scenarios the item catalogues lack the vital associated image data.

BRIEF DESCRIPTION OF THE DRAWINGS

Various ones of the appended drawings merely illustrate example embodiments of the present disclosure and should not be considered as limiting its scope.

Figure 1:
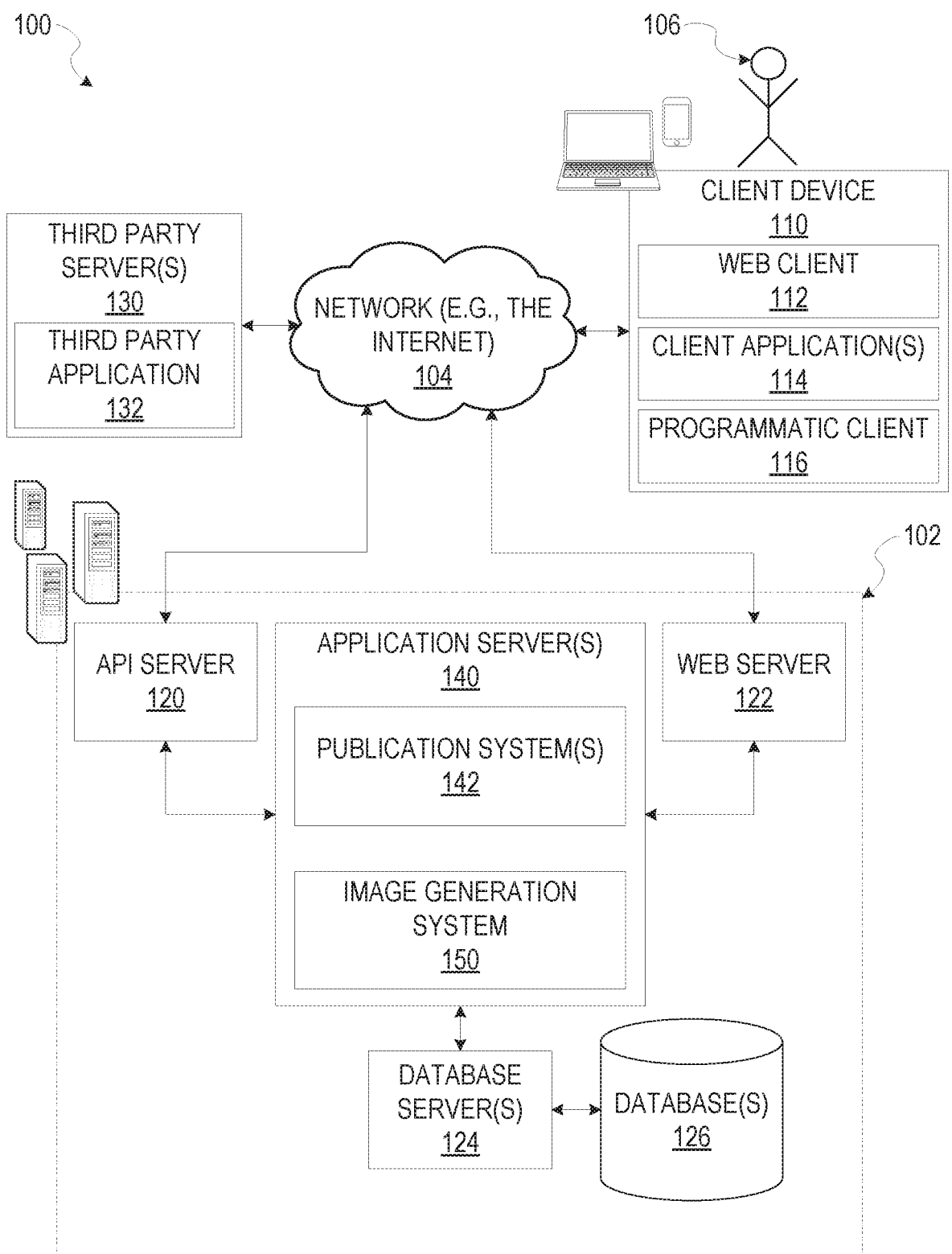
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various embodiments systems and methods for image attribute extraction, base image generation using the extracted image attributes, and introducing variations in the attributes of the generated base image to generate an original image are described. A database may contain a plurality of images in a category, these images are processed and common attributes are identified between the plurality of images, where each of the plurality of images depict an item. Common attributes that can be identified include hue, pattern (e.g., plaid, polka dots, stripes, and the like), style attributes (e.g., wedge shoe style, bell bottom shape pants, toggle buttons, A-line skirt, and the like), and the like. In various embodiments, image background may be removed in order to facilitate image processing and identification of common item attributes. Image background may be isolated and extracted using edge detection method to find the boundaries of objects within the image. Once common attributes are identified and extracted between the plurality of images, a base image is generated using the extracted common attribute. The attributes of the images may be identified by analyzing the image to determine data parameters for an image, such as hue, saturation or intensity, by pattern recognition processing to identify a pattern or shape in the image, or edge recognition processing to identify edges in the image.

In various embodiments, a base image is generated using a standard template of the desired item to be generated, where the standard template is an outline of the desired item with the correct proportions and an identifier of where certain attributes are to be placed. In an example, a standard template outlines the standard proportion of a women wedge shoe. Further, standard template includes attribute identifiers which identifies the location of attributes to be customized such as wedge height, toe shape, platform, straps, and the like. These attribute identifiers identify the area within the image where each associated extracted common attribute can be placed. Once all the extracted common attributes are placed at the associated attribute identifiers on the standard template, an average processing is performed on standard template with the associated common attributes. The end result after image averaging is a base image of the desired item that embodies the identified common attributes.

In various embodiments, a base image is generated by overlaying a plurality of images and extracting the overlapping areas where the overlapped area are most dense (e.g., over a threshold of the number of overlapped images) between the plurality of processed images. The overlapped areas that are below the desired threshold density are discarded. In other words, a plurality of images are superimposed over each other and areas where the superimposed images overlap the highest would be most dense. The areas with high pixel density are outlined and extracted to create a resulting base image that embodies common attributes of each of the plurality of images. In yet further embodiments, the orientation of the plurality of images a adjusted to achieve maximal density overlap in order to generate the base image.

In various embodiments, where items are symmetrical, half of the item image is generated and reconstruction of the remaining half of the symmetrical item is simply the mirror image of the generated half. In one example, half of a shirt can be generated using any of the described methods of created a base image, the other half of the shirt can be a replicated mirror image of the generated half, thus facilitating the image generation.

In various embodiments, after a base image is generated, an original image is generated by introducing variations in the attributes of the base image. Variations in the attributes can include lengthening certain image attributes to obtain a more unique look (e.g., widening certain areas of a sleeve on a shirt), introducing image attributes to the image (e.g., introducing more pockets to a shirt), subtracting image attributes from the base image, altering a certain image attribute (e.g., altering a circle neckline on a shirt to a v-neckline), and the like.

In various embodiments, a similarity check can be processed where the generated original image is compared with the original images to determine to a similarity score. A high similarity score may raise copyright issues and therefore more variations in the attributes would be introduced to the generated base image to create an original image without raising copyright issues when compared with the original images.

With reference to FIG. 1, an example embodiment of a high-level client-server-based network architecture 100 is shown. A networked system 102 provides server-side functionality via a network 104 (e.g., the Internet or wide area network (WAN)) to a client device 110. In some implementations, a user (e.g., user 106) interacts with the networked system 102 using the client device 110. FIG. 1 illustrates, for example, a web client 112 (e.g., a browser, such as the Internet Explorer® browser developed by Microsoft® Corporation of Redmond, Wash. State), client application(s) 114, and a programmatic client 116 executing on the client device 110. The client device 110 includes the web client 112, the client application(s) 114, and the programmatic client 116 alone, together, or in any suitable combination. Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultrabook, netbook, laptop, desktop, multi-processor system, microprocessor-based or programmable consumer electronic, game consoles, set-top box, network Personal Computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi®) network, a World-wide Interoperability for Microwave Access (WiMax) network, another type of network, or any suitable combination thereof.

In some example embodiments, the client device 110 includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps, and e-commerce site apps (also referred to as "marketplace apps"). In some implementations, the client application(s) 114 include various components operable to present information to the user and communicate with networked system 102. In some embodiments, if the e-commerce site application is included in the client device 110, then this application is configured to locally provide the user interface and at least some of the functionalities with the application configured to communicate with the networked system 102, on an as needed basis, for data or processing capabilities not locally available (e.g., access to a database of items available for sale, to authenticate a user, to verify a method of payment). Conversely, if the e-commerce site application is not included in the client device 110, the client device 110 can use its web browser to access the e-commerce site (or a variant thereof) hosted on the networked system 102.

In various embodiments, the user (e.g., the user 106) comprises a person, a machine, or other means of interacting with the client device 110. In some example embodiments, the user is not be part of the network architecture 100, but interacts with the network architecture 100 via the client device 110 or another means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

The web client 112 accesses the various systems of the networked system 102 (e.g., the publication system(s) 142) via the web interface supported by the web server 122. Similarly, the programmatic client 116 and client application(s) 114 accesses the various services and functions provided by the networked system 102 via the programmatic interface provided by the API server 120. The programmatic client 116 can, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

An Application Program Interface (API) server 120 and a web server 122 is coupled to, and provide programmatic and web interfaces respectively to, one or more application server(s) 140. The application server(s) 140 hosts one or more publication system(s) 142, and an image generation system 150, each of which comprises one or more modules or applications and each of which can be embodied as hardware, software, firmware, or any combination thereof. The application server(s) 140 are, in turn, shown to be coupled to one or more database server(s) 124 that facilitate access to one or more information storage repositories or database(s) 126. In an example embodiment, the database(s) 126 are storage devices that store information to be posted (e.g., publications or listings) to the publication system(s)

142. The database(s) 126 also stores digital good information in accordance with some example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

In some implementations, the image generation system 150 provides functionality to generate an original image based on identified common attributes from a plurality of existing related images. In some example embodiments, the image generation system 150 communicates with the client device 110, the third party server(s) 130, the publication system(s) 142 (e.g., retrieving listings). In an alternative example embodiment, the system 150 is a part of the publication system(s) 142. The image generation system 150 will be discussed further in connection with FIG. 2 below.

Further, while the network architecture 100 shown in FIG. 1 employs a client-server architecture, the present inventive subject matter is, of course, not limited to such an architecture, and can equally well find application in a distributed, or peer-to-peer, architecture system, for example. The various systems of the applications server(s) 140 (e.g., the publication system(s) 142 can also be implemented as standalone software programs, which do not necessarily have networking capabilities.

Figure 2:
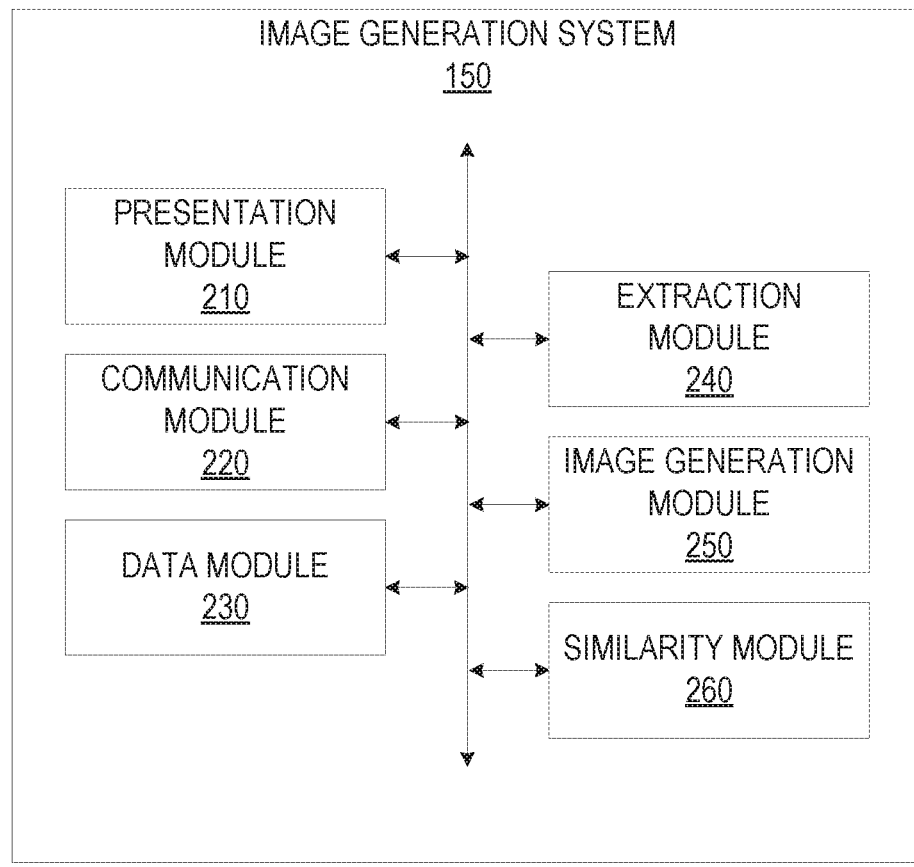
FIG. 2 is a block diagram illustrating an example embodiment of an image generation system, according to some example embodiments.

FIG. 2 is a block diagram of the image generation system 150 that provides functionality to extract image attributes, generate a base image using the extracted image attribute, and generating an original image by introducing variations to the attributes of the base image, according to some example embodiments. In an example embodiment, the image generation system 150 includes a presentation module 210, a communication module 220, a data module 230, an extraction module 240, an image generation module 250, and a similarity module 260. All, or some, of the modules 210-260 of FIG. 2, communicate with each other, for example, via a network coupling, shared memory, bus, and the like. It will be appreciated that each module of modules 210-260 can be implemented as a single module, combined into other modules, or further subdivided into multiple modules. Other modules not pertinent to example embodiments can also be included in the filtering system 150, but are not shown.

In some implementations, the presentation module 210 provides various presentation and user interface functionality operable to interactively present and receive information from the user. For instance, the presentation module 210 can cause presentation of the generated original images at a user interface for use such as posting items. In various implementations, the presentation module 210 presents or causes presentation of information (e.g., visually displaying information on a screen, acoustic output, haptic feedback). Interactively presenting information is intended to include the exchange of information between a particular device and the user. Further, it will be appreciated that "presenting" as used herein is intended to include communicating information or instructions to a particular device that is operable to perform presentation based on the communicated information or instructions.

The communication module 220 provides various communications functionality and web services. For example, the communication module 220 provides network communication such as communicating with the networked system 102, the client device 110, and the third party server(s) 130. In various example embodiments, the network communication can operate over wired or wireless modalities. Web services are intended to include retrieving information from the third party server(s) 130, the database(s) 126, and the application server(s) 140. In some implementations, information retrieved by the communication module 220 comprises data associated with the user (e.g., user profile information from an online account, social network service data associated with the user), data associated with one or more items or products listed on the publication system 142 (e.g., images of the item, reviews of the item, item price), or other data to facilitate the functionality described herein. In this way, the communication module 220 facilitates communication between the image generation system 150, the client device 110, and the third party server(s) 130 via the network 104.

The data module 230 is configured to provide functionality to categorize and maintain image attribute information via database servers 124 in the database 126 using associated metadata. The data module 230 accesses image attribute data associated with respective images for use by the extractor module 240. Images are categorized in the database 126 according to the type of item the image depicts. Images can be further categorized in multiple subcategories. In an example, a category can be the brand of the item with an item style subcategory, and a color subcategory. The images in database 126 have associated metadata identifying attributes of the image for correct categorization. The associated metadata describes characteristics of the image content which includes image attributes, where image attributes refer to technical characteristics of the image. Technical characteristics of the image can be in the form of HSV values (hue saturation values), shapes of items depicted within the image, relative lengths of items depicted within the image, pattern, texture, and the like. For example, for an image depicting a shoe has an associated metadata describing image attributes of the shoe as a women pump style shoe, red color, model year Spring 2015, brand Sassy, heel height three inches, stripe pattern, canvas material, and the like. Images may be added to the database 126 by user's of an online e-market place (e.g., such as eBay) via posting items with images and descriptions of the items. The associated descriptions become associate metadata describing image attributes of the image. Metadata may also be updated to include more information at a later time. In this way, the metadata is used to identify image attributes included within the corresponding images.

In various embodiments, the data module 230 is configured to identify image attributes including HSL or HSV value (e.g., an indication of a three dimensional color space based on hue, saturation, and brightness), contrast, and the like. Metadata associated with the image may lack certain image attributes which can be automatically identified by the data module 230. Image brightness can be determined based on an average of the grayscale intensity profile of an image. Hue indicates the presence of colors found in the image and can be computed using values within the RGB color space (e.g., where red, green, and clue light are added together in various ways to produce a broad array of colors.) Saturation is the color intensity relative to the brightness can be calculated using the difference between the maximum RGB hue value and minimum RGB hue value divided by the maximum RGB hue value. Brightness may represent an amount of illumination within the image and may be computed from an average grayscale intensity of the image. Image contrast can be determined by a ratio of the brightest color in the image (e.g., the minimum grayscale intensity, which is the lightest portion of the image) to that of the darkest color in the image (e.g., the maximum grayscale intensity, which is the darkest portion of the image). Image contrast can also be calculated for a range of intensities found in the lightest portion of the image (an average intensity of a portion of the image that is light) to the darkest portion of the image (an average intensity of a portion of the image that is dark). The values of saturation, brightness, and contrast is used to indicate the quality of the image. In some embodiments, high quality images (e.g., measured by a quality threshold) are used as a basis to generate an original image.

In various embodiments, the data module 230 can determine a variable background (e.g., a busy background with too much variances) using an image contrast histogram an the RGB color space values of the image. Too much differences in color and contrast between pixels that are located near one another indicate the background is variable exceeding a desired threshold amount and thus should be eliminated before using it as a base for an original image generation. In other embodiments, all backgrounds are eliminated and the remaining item depicted on the image are used as a basis for an original image generation. In various embodiments, edge detection techniques may be used to determine the shape of the items and extract the item from the remaining background. In yet other embodiments, patterns and items depicted in the image can be identified using unsupervised classification methods including K-means clustering, Gaussian mixture models that classify image pixels into foreground (e.g., white pixels) and background (e.g., black pixels), and Hidden Markov models. In this way, the data module 230 identifies the items depicted in the image and the patterns included in the items. These techniques are employed to differentiate an image from the background.

The extraction module 240 provides functionality to identify and extract attributes that are common between several images. In some embodiments, a user has an option to choose what type of original image is to be created. In response to the user selecting the category the user desires of the type of image to be created, the extraction module 240 access all available image within the selected categories and identify common attributes. The selectable category can be presented to the user at a user interface. The selectable categories can be presented in a drop down selection of categories and subcategories, the subcategories being more specific attributes of the categories. The user can select one or more categories and one or more subcategories in choosing the type of original image to be created. Alternatively, the user can access images that are present within each category and subcategory, and may choose one or more images to be used as the basis to extract common attributes to create an original image. In response to the user selecting a category, the extraction module 240 access all images within the selected category in database 126, determine common image attributes between those images.

The extraction module 240 identifies common image attributes between images within a selected category by comparing the image attributes identified by the data module 230. Using the associated metadata of the images, the extraction module 240 determines the image attributes shared by a percentage of images. In one example, seventy percent of images within a selected shirt category shares the image attribute of long-sleeves. If the percentage is above a determined threshold, the extraction module 240 identifies the image attribute to be a common attribute for images within the selected category.

The image generation module 250 provides functionality to generate an a base image using the identified common attributes and their associated images. In various embodiments, the images associated with the identified common attributes are centered, overlayed, and the pixel values of the images are averaged to generate a base image. Using the associated metadata, the same angle view of the images are averaged to create the base image. For example, only images depicting a front view of the selected shirt category are averaged, whereas the images depicting the side views are separated overlayed and averaged.

In yet various embodiments, a base image is generated by overlaying a plurality of images and extracting the overlapping areas where the overlapped area are most dense (e.g., above a certain percentage and measured by the number of overlapped images over the number of images used). The backgrounds of the images are identified and eliminated by the data module 230 as discussed above and resulting in only the items depicted in the images. The extracted items with similar identified view angles (e.g., front view would be overlayed separately from back view or side view images) are centered and overlayed. The overlapped areas with a high amount of overlap (e.g., measured by a percentage of overlapping images, that is the number of overlapped items divided by the actual amount of images overlaying one another) are extracted. The remaining area is a base image depicting an area that has a high percentage of overlapping items based on a plurality of images being overlayed. In various embodiments, the orientation of each image is detected and adjusted using edge detection. The items of each image are identified using edge detection techniques are discussed above in association with the data module 230. The orientation of each image is corrected by rotating the image until the highest area of image overlap is achieved. In some embodiments, several collective permutations of image overlap are processed to achieve maximal overlap of the plurality of images to create a base image with the largest amount of area overlap. In other embodiments, as each image is superimposed, the image is rotated individually to maximize the area density overlap.

In further various embodiments, the image generation module 250 provides functionality to generate an original image by adding variations to the attributes of the generated base image. The base image was generated using a plurality of images sharing common image attributes within a selected category and therefore an average of the plurality of images. In order to generate an original image, variations of the attributes are introduced to the base image to create an image that is unique and different than the average of the plurality of images. In some embodiments, variations to the attributes include integrating an additional image attribute to the base image by selecting template image attributes from the database 126 that are not identified as a common attribute by the extraction module 240. For example, in a base image generated for the shirt category an additional image attribute can be toggle buttons since no shirts in the category had toggle buttons (and therefore not identified as a common attribute). Toggle buttons are selected from template image attributes from the database 126, which include image attributes that are known image attributes in its respective categories. In other embodiments, variations to the attributes include eliminating or removing an image attribute from the generated base image, the image attribute being removed in whole or in part. For example, a base image of a dress shirt has been generated with four buttons. Removing of the button attributes can include removing all four buttons or one button.

In some embodiments, adding variations to the attributes include altering the proportions of the base image. Altering the proportions may include lengthening, widening, widening, or slimming specific image attributes of the base image. The extent of the altered proportions depends on a predefined range set by a standard template. The image generation module 250 accesses a standard template for each selected category (or selected subcategory), where the standard template identifies the location of each image attribute of proportions that may be altered. A user may select the image attributes (e.g., sleeves, neck collar, length of a shirt, heel height, and the like) and the type of alterations to be added (lengthening, widening, widening, slimming, and the like). Using the identified location from a standard template, the associated location of the base image is altered based on the selected type of alteration. In another example, standard templates for the selected category women high-heel shoes can be accessed and used to identify the image attribute and the associated location. The standard template for the high-heel shoes category includes attribute identifiers that can be included in high-heel shoes including its associated location. In an example, attribute identifiers include the type of heel in the back of the shoe, the toe shape in the front of the shoe, a platform on the bottom of the toe, straps located right above the heel or in the middle top region of the shoe, and the like. In yet some embodiments, adding variations to the attributes include modifying an existing image attributes. For example, an existing attribute of a V-neck shape is altered to form a round neck shaped. In these ways, the image generation module 250 introduced variations to the attributes to a base image to create an original image.

In various embodiments, the similarity module 260 provides functionality to perform a similarity check by comparing the generated original image with each image within the selected category (that was used to create a base image). Images may be converted to a grayscale image and image pixel values are compared to determine a similarity value between the created original image and each of the image used to create the base image. Where a similarity value is above a predefined value (e.g., measured by a similarity threshold value), the images are considered to be too similar and therefore the image generation module 250 introduces further variations to the attributes of the generated original image. In some embodiments, the purpose of introducing further variations to the attributes where images are considered too similar is to avoid copyright problems that arise in using images are may be considered too similar. Further variations to the attributes are added until the similarity value between the created original image is below the similarity threshold value, thereby indicating the created original image is unique and different from existing images.

Figure 3:
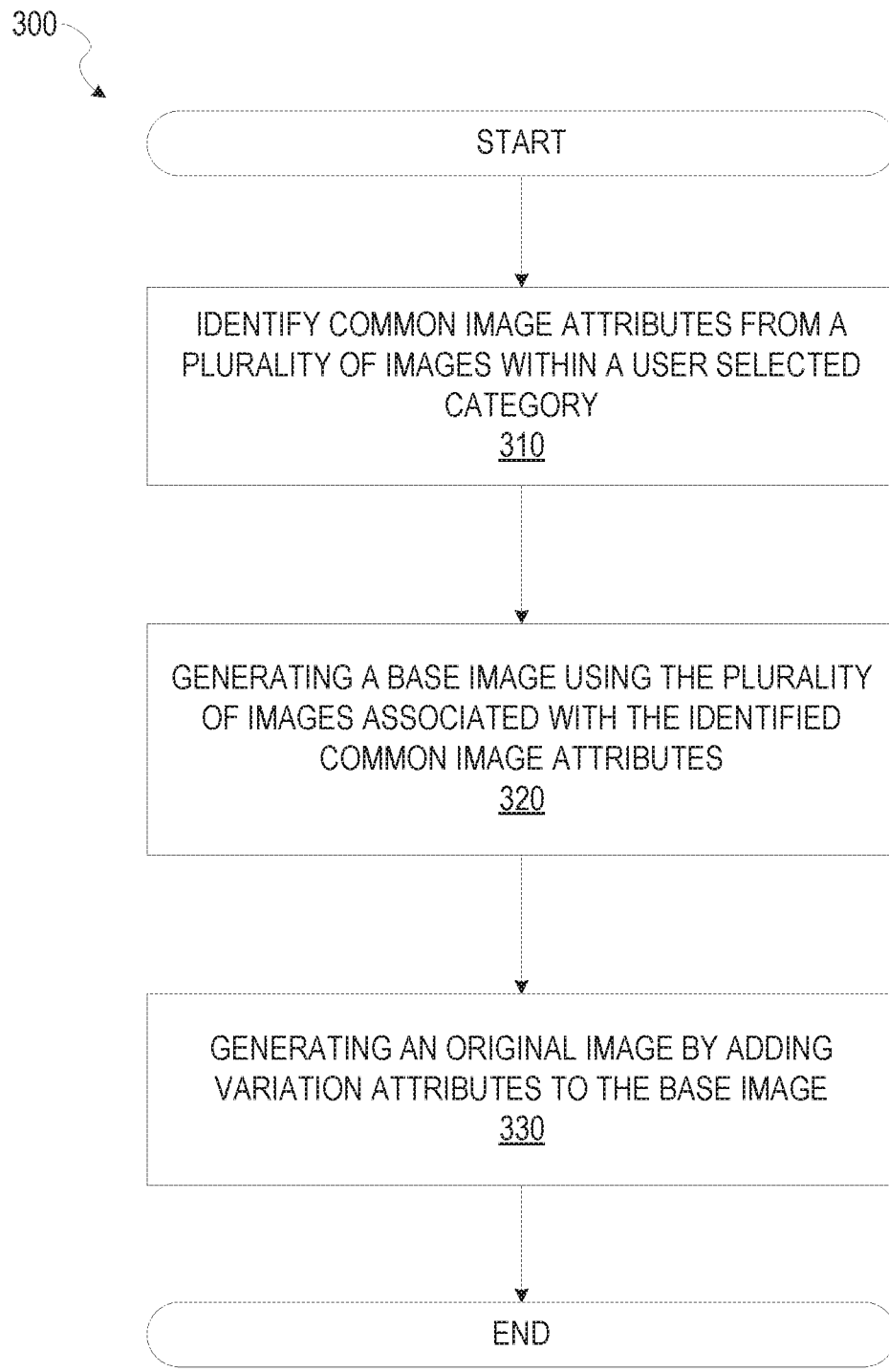
FIG. 3 is a flow diagram illustrating an example method for generating an original image of an item, according to some example embodiments.

FIG. 3 is a flow diagram illustrating an example method 300 for generating an original image of an item. At operation 310, the extraction module 240 identifies common image attributes from a plurality of images within a user selected category. In some embodiments, a user has an option to choose what type of original image is to be created by selecting categories where the original image would belong. The extraction module 240 access all available image within the selected categories and identify common attributes using associated metadata describing respective images. A common image attribute is determined where a predefined percentage of images share the common image attribute (measured by a threshold).

At operation 320, the image generation module 250 generates a base image using the plurality of images associated with the identified common image attribute. In various embodiments, the images associated with the identified common attributes are centered, overlay, and the pixel values of the images are averaged to generate a base image. In some embodiments, the items depicted in the images are differentiated from the background and extracted using edge detection techniques. The item images without the background are then subsequently used for averaging to generate a base image. In various embodiments, the item images without the background are centered and overlay over one another and the overlapped area (e.g., overlapped area where the number of overlapped images are above a certain percentage of overlap out of the number of images used) are extracted to create a base image.

Figure 6:
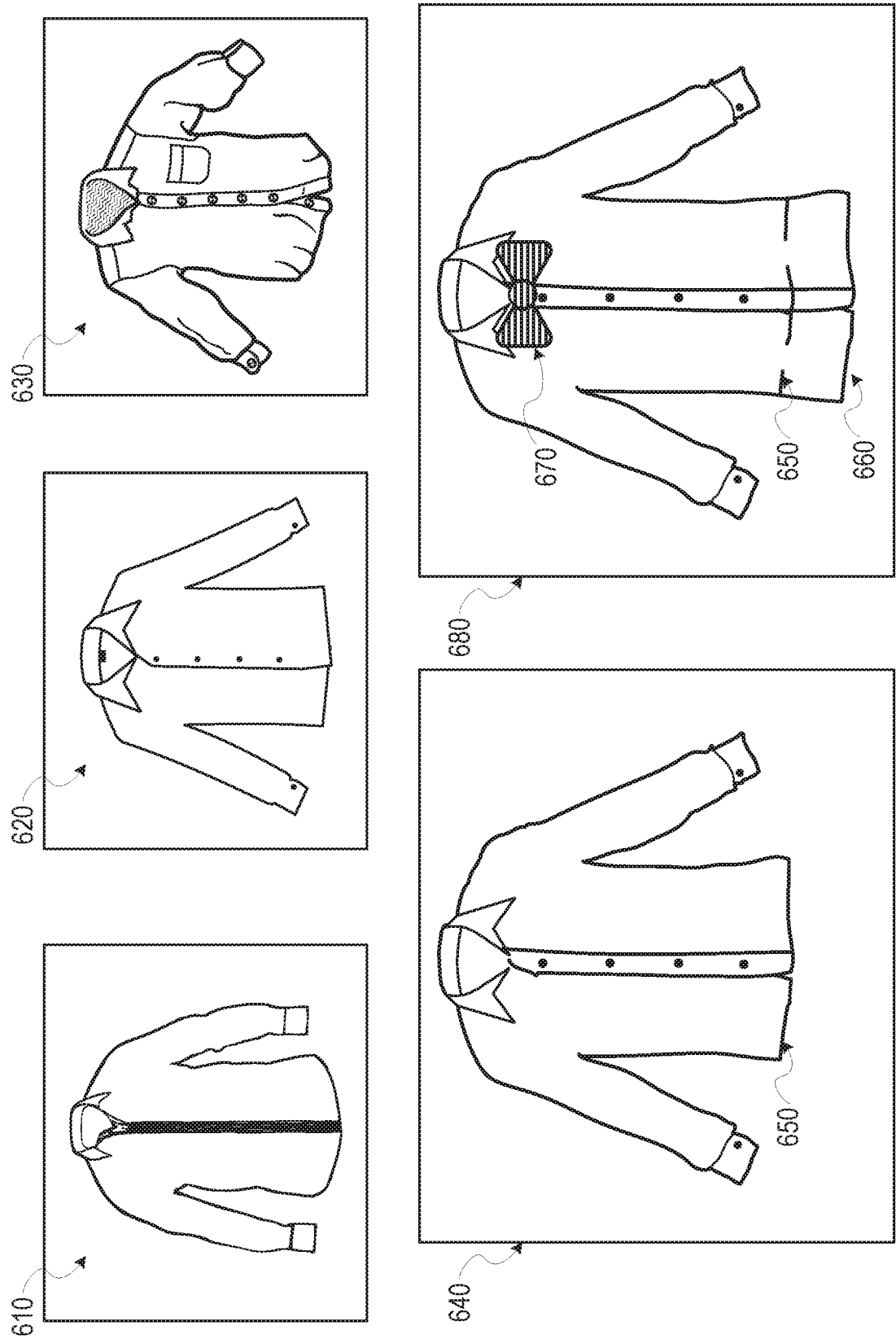
FIG. 6 is a data diagram illustrating an example method of image processing for generating a base image and generating an original image using the base image.

At operation 330, the image generation module 250 generates an original image by varying attributes within the generated base image. Varying attributes within the generated base image include introducing variation attributes as fully described in detail above in association with the image generation module 250 in FIG. 2. In some embodiments, varying attributes include integrating at least one additional image attribute to the base image. The additional image attribute is not part of the common attribute identified by the extraction module 240. In an example, as shown in FIG. 6 additional image attribute 670 (e.g., in this example a bow tie is depicted) is added to the base image 640. The additional image attribute 670 was not identified as a common attribute. In some embodiments, varying attributes include altering the proportion of at least one common image attribute included in the base image. Altering the proportions include lengthening, widening, widening, or slimming specific image attributes of the base image. In an example, as shown in FIG. 6, the proportions of the length of the shirt is lengthened from the original position 650 in the base image to the lengthened position 660 (a position measured relative to the original position within the base image) in this new original image. In some embodiments, one or both additional image 670 and lengthened proportion 660 is added to the base image 640 as a variation of an image attribute resulting in an original image 680. In other embodiments, varying attributes within the base image include removing one or more image attributes within the base image. The one or more image attributes can be removed in whole or in part.

Figure 4:
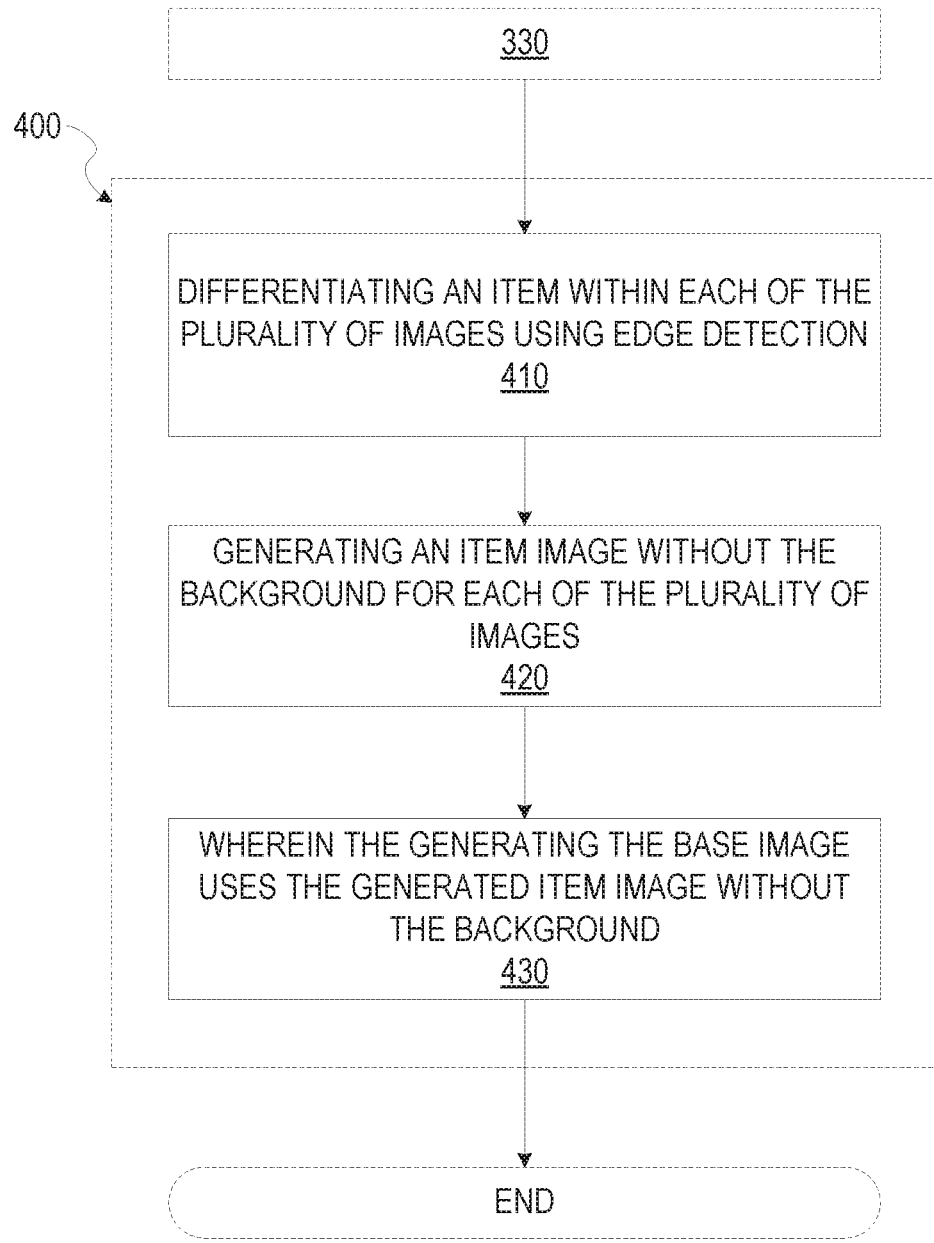
FIG. 4 is a flow diagram illustrating an example method for identifying an item depicted within an image.

FIG. 4 is a flow diagram illustrating an example method 400 for identifying an item depicted within an image. At operation 410, the data module 230 differentiates an item within each of the plurality of images using edge detection techniques. The data module 230 detects the edges of the item depicted, extracts the items, and generates a new item image without the background for each of the plurality of images at operation 420. At operation 430, the item images without the background are then subsequently used for averaging to generate a base image. Eliminating the background before using the images to create a base image results in a less noisy base image and leads to using less computational resource due to not having to process the background images in creating the base image.

Figure 5:
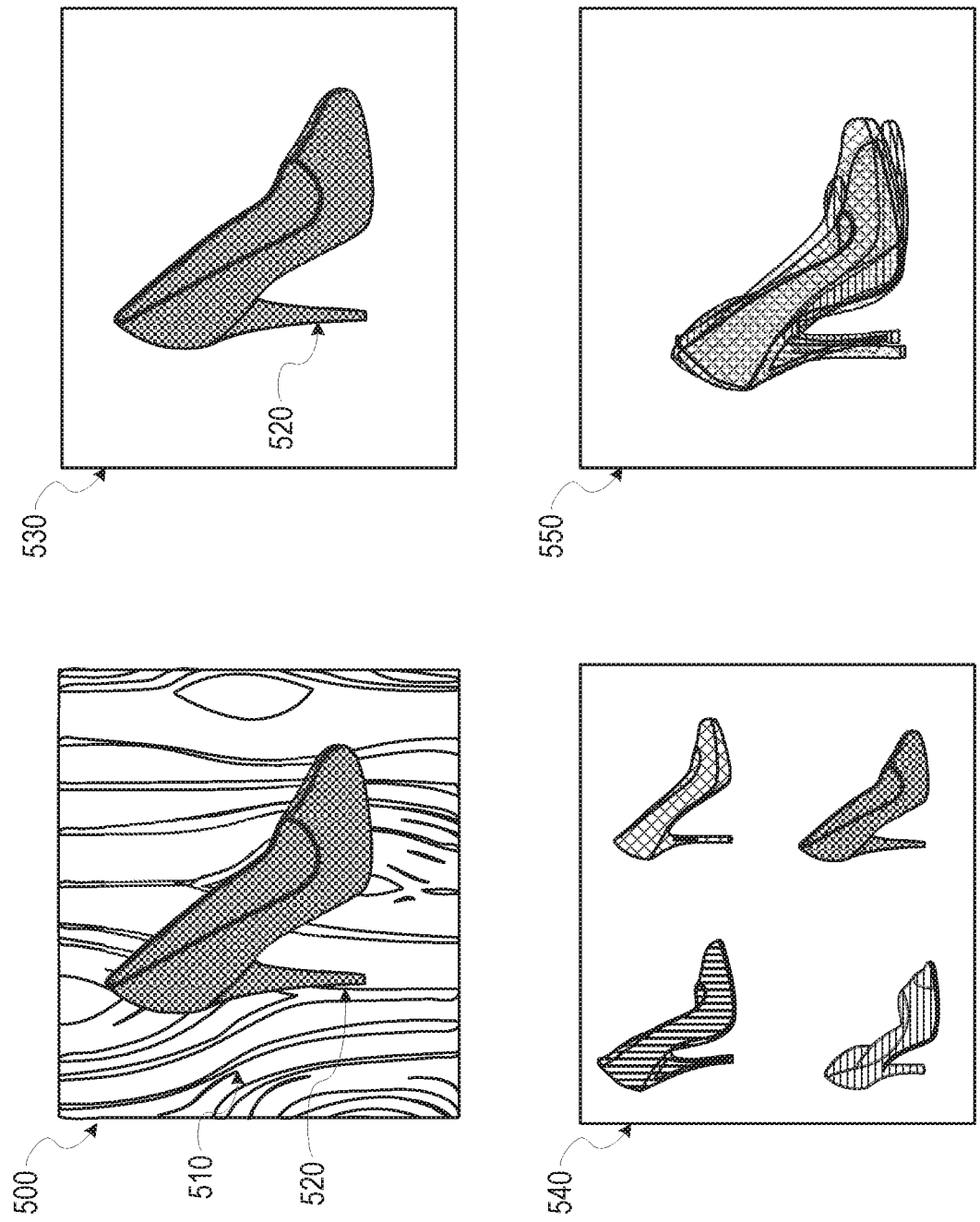
FIG. 5 is a data diagram illustrating an example method of image processing for generating a base image.

FIG. 5 is a data diagram illustrating an example method of image processing for generating a base image. Image 500 depicts an image of an item 520 with background 510. In some embodiments, edge detection techniques are used by the data module 230 to differentiate the background 510 from the item 520. The item 520 is extracted and an item image 530 is generated with the background 510 is removed. In an example, a user selects a category of pump shoes to generate an original image. The extraction module 240 identifies images with common attributes between the images within the category of pump shoes within database 126. Images 540 illustrates a plurality of images that are within a category of pump shoes that share common images attributes with the respective backgrounds removed. In some embodiments, the image generation module 250 centers all the images in 540, overlay image 550 shoes images in 540 being overlay on top of one another. The overlapped area where the number of overlapped images are above a predetermined percentage are extracted. In this example, the predetermined percentage is seventy-five percentage, and therefore the area where three or more images are overlapped is extracted. The overlap area with three or more images overlapping are extracted and a base image is generated. In other embodiments, the orientation of images 540 are adjusted to achieve maximal overlap of the plurality of images 540 to create the base image. The orientation correction is performed in a 2-dimensional space is a Cartesian coordinate. In other embodiments, the orientation correction is performed in a 3-dimensional space.

FIG. 6 is a data diagram illustrating an example method of image processing for generating a base image and generating an original image using the base image. A user selects image 610, image 620, and image 630 from among a plurality of images in order to generate an original image 680. The data module 230 differentiates the background from the items and removes the background resulting in the images 610, 620, and 630. The image generation module 250 converts images 610, 620, and 630 to its grayscale form and averages the pixel values of images 610, 620, and 630 to generate a base image 640. The image generation module 250 adds variations to the attributes of the base image 640 to generate an original image 680. Variations to the attributes include adding in an additional image attribute 670 (e.g., a bow tie). In other embodiments, adding variations to the attributes include altering the proportion of at least one common image attribute included in the base image. Altering the proportions include lengthening, widening, widening, or slimming specific image attributes of the base image. In original image 680, the proportions of the length of the shirt is lengthened from the original position 650 in the base image to the lengthened position 660 in this new original image. In some embodiments, one or both additional image 670 and lengthened proportion 660 is added to the base image 640 as a variation to an image attribute resulting in an original image 680.

Modules, Components, and Logic

Figure 7:
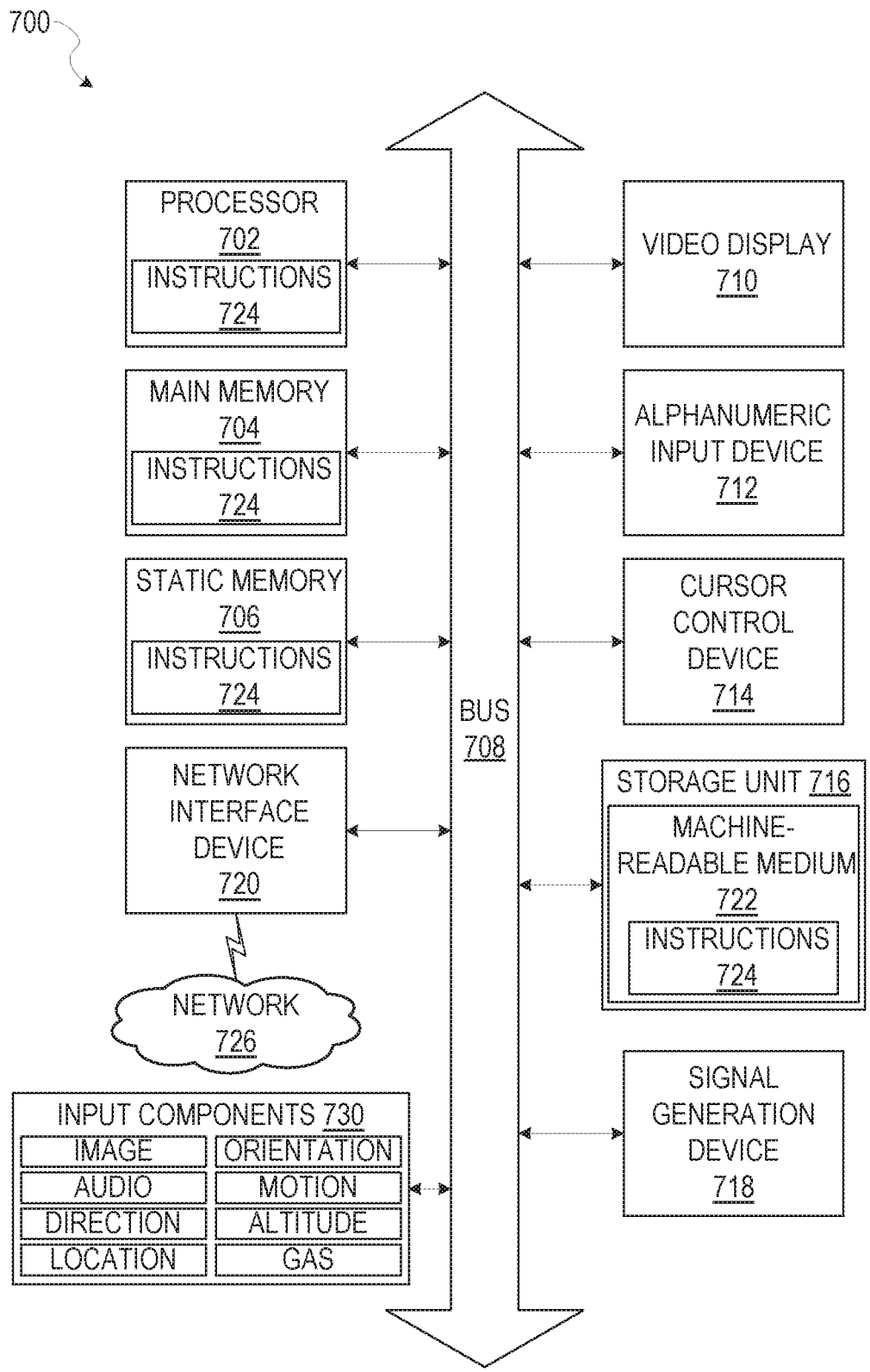
FIG. 7 illustrates a diagrammatic representation of a machine in the form of a computer system within which a set of instructions may be executed for causing the machine to perform any one or more of the methodologies discussed herein, according to an example embodiment.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 724 (e.g., software, a program, an application, an applet, an app, or other executable code) for causing the machine 700 to perform any one or more of the methodologies discussed herein may be executed. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine 700 is illustrated, the term "machine" shall also be taken to include a collection of machines 700 that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a video display 710 (e.g., a plasma display panel (PDP), a light emitting diode (LED) display, a liquid crystal display (LCD), a projector, or a cathode ray tube (CRT)). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 embodying any one or more of the methodologies or functions described herein. The instructions 724 may also reside, completely or at least partially, within the main memory 704, within the static memory 706, within the processor 702 (e.g., within the processor's cache memory), or all three, during execution thereof by the machine 700. Accordingly, the main memory 704, static memory 706 and the processor 702 may be considered as machine-readable media 722. The instructions 724 may be transmitted or received over a network 726 via the network interface device 720.

In some example embodiments, the machine 700 may be a portable computing device, such as a smart phone or tablet computer, and have one or more additional input components 730 (e.g., sensors or gauges). Examples of such input components 730 include an image input component (e.g., one or more cameras, an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 722 able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions 724. The term "machine-readable medium" shall also be taken to include any medium, or combination of multiple media, that is capable of storing instructions (e.g., instruction 724) for execution by a machine (e.g., machine 700), such that the instructions, when executed by one or more processors of the machine 700 (e.g., processor 702), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. The term "machine-readable medium" specifically excludes non-statutory signals per se.

Furthermore, the machine-readable medium 722 is non-transitory in that it does not embody a propagating signal. However, labeling the machine-readable medium 722 as "non-transitory" should not be construed to mean that the medium is incapable of movement, the medium should be considered as being transportable from one physical location to another. Additionally, since the machine-readable medium 722 is tangible, the medium may be considered to be a machine-readable device.

The instructions 724 may further be transmitted or received over a communications network 726 using a transmission medium via the network interface device 720 and utilizing any one of a number of well-known transfer protocols (e.g., Hypertext Transfer Protocol (HTTP)). Examples of communication networks include a local area network (LAN), a wide area network (WAN), the Internet, mobile telephone networks (e.g. 3GPP, 4G LTE, 3GPP2, GSM, UMTS/HSPA, WiMAX, and others defined by various standard setting organizations), plain old telephone service (POTS) networks, and wireless data networks (e.g., Wi-Fi and Bluetooth networks). The term "transmission medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 722 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor 702, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions described herein. As used herein, "processor-implemented module" refers to a hardware module implemented using one or more processors 702.

Similarly, the methods described herein may be at least partially processor-implemented, with a processor 702 being an example of hardware. For example, at least some of the operations of a method may be performed by one or more processors 702 or processor-implemented modules. Moreover, the one or more processors 702 may also operate to support performance of the relevant operations in a "cloud computing" environment or as a "software as a service" (SaaS). For example, at least some of the operations may be performed by a group of computers (as examples of machines 700 including processors 702), with these operations being accessible via the network 726 (e.g., the Internet) and via one or more appropriate interfaces (e.g., an application program interface (API)).

The performance of certain of the operations may be distributed among the one or more processors 702, not only residing within a single machine 700, but deployed across a number of machines 700. In some example embodiments, the one or more processors 702 or processor-implemented modules may be located in a single geographic location (e.g., within a home environment, an office environment, or a server farm). In other example embodiments, the one or more processors 702 or processor-implemented modules may be distributed across a number of geographic locations.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
one or more hardware processors;
one or more hardware memories storing instructions that, when executed configures the one or more hardware processors to perform operations comprising:
identifying a template for a category of products, the template defining locations of attributes of products belonging to the category;
identifying common attributes of products of the category based on the template,
overlaying corresponding views of images representing products having the common attributes of the products belonging to the category;
averaging corresponding pixel values across the images representing the products having the common attributes;
generating, using the averaged corresponding pixel values, an image representing a new product, the image representing the new product comprising the averaged corresponding pixel values; and
generating a modified image by varying attributes of the new product based on the locations of the attributes defined by the template.

2. The system of claim 1, the operations further comprising modifying the image by adding at least one image attribute to the image, the added at least one image attribute not identified as a common attribute.

3. The system of claim 1, the operations further comprising changing a proportion of at least one common image attribute included in the image when generating the modified image.

4. The system of claim 3, wherein changing the proportion of the at least one common image attribute includes at least one of elongating, shortening, widening, or slimming a specific portion of the at least one image attribute.

5. The system of claim 1, the operations further comprising modifying at least one image attribute depicted in the image.

6. The system of claim 1, the operations further comprising:
calculating a similarity value between the image and each of the of images representing products; and
varying additional attributes of the image in response to the similarity value being above a similarity threshold.

7. The system of claim 1, wherein the generating of the image includes:
identifying an item within each of the images representing products using edge detection;
generating an item image without a background for each of the images representing products based on the identified items in each of the plurality of images, and
wherein the generating of the image is based on the generated item images without the background.

8. The system of claim 7, the operations further comprising:
generating an overlaid image by overlaying the item images without the background;
determining one or more areas within the overlaid image where a number of overlapped item images exceeds a predefined percentage of the item images;
removing the determined areas from the overlaid image; and
generating the image based on the overlaid image.

9. A method comprising:
identifying, via hardware processing circuitry, a template for a category of products, the template defining locations of attributes of products belonging to the category;
identifying, via the hardware processing circuitry, common attributes of products of the category based on the template;
overlaying, via the hardware processing circuitry, corresponding views of images representing products having the common attributes of the products belonging to the category;
averaging, via the hardware processing circuitry, corresponding pixel values across the images representing the products having the common attributes;
generating, via the hardware processing circuitry and using the averaged corresponding pixel values, an image representing a new product, the image representing the new product comprising the averaged corresponding pixel values; and
generating, via the hardware processing circuitry, a modified image by varying attributes of the new product based on the locations of the attributes defined by the template.

10. The method of claim 9, further comprising modifying the image by adding at least one image attribute to the image, the added at least one image attribute not identified as a common attribute.

11. The method of claim 9, further comprising changing a proportion of at least one common image attribute included in the image when generating the modified image.

12. The method of claim 11, wherein changing the proportion of the at least one common image attribute includes at least one of elongating, shortening, widening, or slimming a specific portion of the at least one image attribute.

13. The method of claim 9, further comprising modifying at least one image attribute depicted in the image.

14. The method of claim 9, further comprising:
calculating a similarity value between the image and each of the of images representing products; and
varying additional attributes of the image in response to the similarity value being above a similarity threshold.

15. The method of claim 9, wherein the generating of the image includes:
identifying an item within each of the images representing products using edge detection;
generating an item image without a background for each of the images representing products based on the identified items in each of the plurality of images, and wherein the generating of the image is based on the generated item images without the background.

16. The method of claim 15, further comprising:
generating an overlaid image by overlaying the item images without the background;
determining one or more areas within the overlaid image where a number of overlapped item images exceeds a predefined percentage of the item images;
removing the determined areas from the overlaid image; and
generating the image based on the overlaid image.

17. A non-transitory computer readable storage medium comprising instructions that when executed configure hardware processing circuitry to perform operations comprising:
identifying a template for a category of products, the template defining locations of attributes of products belonging to the category;
identifying at least one common attribute of products of the category based on the template;
overlaying corresponding views of images representing products having the common attributes of the products belonging to the category;
averaging corresponding pixel values across the images representing the products having the at least one common attribute;
generating, using the averaged corresponding pixel values, an image representing a new product, the image representing the new product comprising the averaged corresponding pixel values; and
generating a modified image by varying attributes of the new product based on the locations of the attributes defined by the template.

18. The non-transitory computer readable storage medium of claim 17, the operations further comprising modifying the image by adding at least one image attribute to the image, the added at least one image attribute not identified as a common attribute.

19. The non-transitory computer readable storage medium of claim 17, the operations further comprising changing a proportion of at least one common image attribute included in the image when generating the modified image, wherein changing the proportion of the at least one common image attribute includes at least one of elongating, shortening, widening, or slimming a specific portion of the at least one image attribute.

20. The non-transitory computer readable storage medium of claim 17, the operations further comprising:
calculating a similarity value between the image and each of the of images representing products; and
varying additional attributes of the image in response to the similarity value being above a similarity threshold.

* * * * *